(12) United States Patent
Nakagawa et al.

(10) Patent No.: US 8,282,376 B2
(45) Date of Patent: Oct. 9, 2012

(54) MOLD FOR FORMING GOLF BALL AND GOLF BALL MANUFACTURED USING THE SAME

(75) Inventors: Takuma Nakagawa, Chichibu (JP); Katsunori Sato, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 322 days.

(21) Appl. No.: 12/483,596

(22) Filed: Jun. 12, 2009

(65) Prior Publication Data
US 2010/0316756 A1    Dec. 16, 2010

(51) Int. Cl.
A63B 45/00  (2006.01)
B29C 45/26  (2006.01)

(52) U.S. Cl. ............... 425/116; 425/289; 425/408

(58) Field of Classification Search .................. 425/116, 425/289, 408, 806
See application file for complete search history.

(56) References Cited

U.S. PATENT DOCUMENTS

| | | | | |
|---|---|---|---|---|
| 2,787,024 A | * | 4/1957 | Smith | 264/161 |
| 4,501,715 A | * | 2/1985 | Barfield et al. | 264/248 |
| 5,407,341 A | * | 4/1995 | Endo et al. | 425/116 |
| 5,494,631 A | * | 2/1996 | Oka et al. | 264/161 |
| 5,554,337 A | * | 9/1996 | Ihara | 264/442 |
| 6,644,948 B2 | * | 11/2003 | Mydlack et al. | 425/116 |
| 6,685,455 B2 | * | 2/2004 | Ogg | 425/116 |
| 6,685,456 B2 | * | 2/2004 | Sajima | 425/116 |
| 7,422,529 B2 | * | 9/2008 | Aoyama et al. | 473/383 |
| 2010/0167846 A1 | * | 7/2010 | Hirau et al. | 473/378 |
| 2010/0197428 A1 | * | 8/2010 | Aoyama et al. | 473/379 |
| 2010/0316456 A1 | * | 12/2010 | George | 408/230 |
| 2010/0317464 A1 | * | 12/2010 | Nakagawa et al. | 473/378 |

FOREIGN PATENT DOCUMENTS

| | | |
|---|---|---|
| JP | 6-46926 U | 6/1994 |
| JP | 11-114092 A | 4/1999 |
| JP | 2007-268265 A | 10/2007 |
| JP | 2009-95668 A | 5/2009 |

* cited by examiner

*Primary Examiner* — Yogendra Gupta
*Assistant Examiner* — Emmanuel S Luk
(74) *Attorney, Agent, or Firm* — Sughrue Mion, PLLC

(57) ABSTRACT

There are provided a mold for forming a golf ball, which allows a dimple formed near the equator of golf ball corresponding to the partition surface of upper and lower molds to be formed so as to have the same shape as that of a dimple formed in other regions, and a golf ball manufactured using this mold. The mold for forming a golf ball in accordance with the present invention includes at least two body parts, a cavity is formed within the mold by the joining of the at least two body parts, and in at least one of the body parts, a groove for forming a projecting land part which is ground after the formation of the golf ball is provided in a cavity wall surface adjacent to the whole circumference of a parting line formed by the joining.

7 Claims, 3 Drawing Sheets

FIG.2
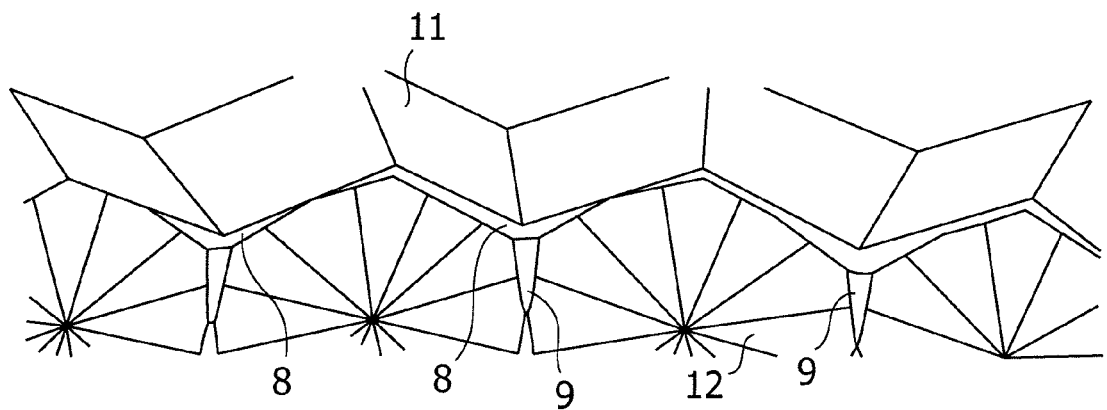
FIG.3(A)     FIG.3(B)
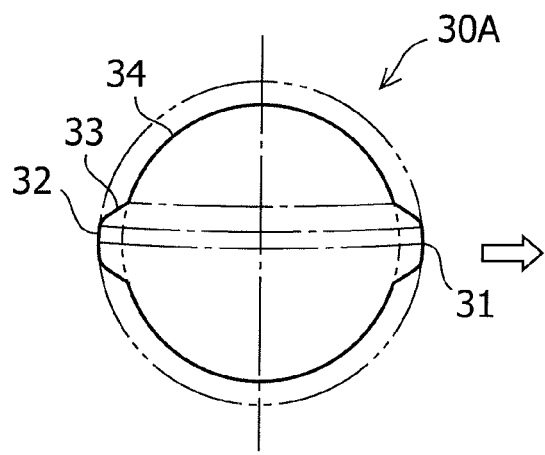 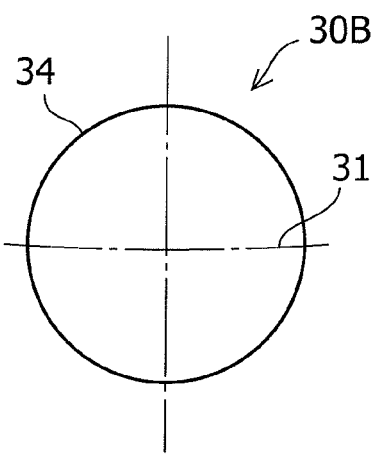
FIG.4
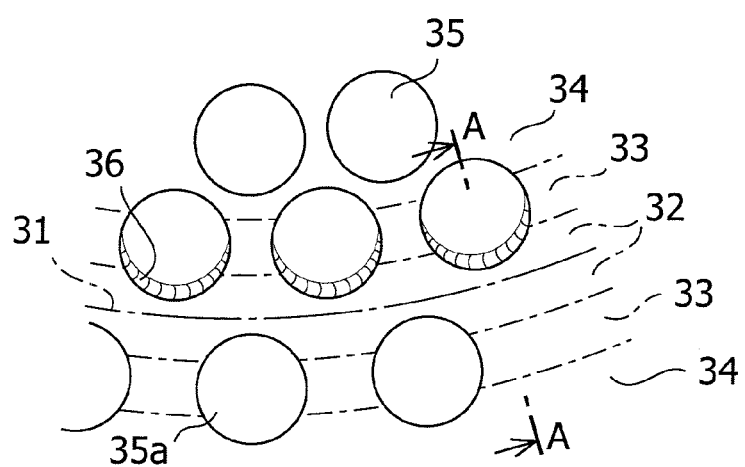

MOLD FOR FORMING GOLF BALL AND GOLF BALL MANUFACTURED USING THE SAME

FIELD OF THE INVENTION

The present invention relates to a mold for forming a golf ball and to a golf ball manufactured using this mold.

BACKGROUND OF THE INVENTION

As is widely known, a golf ball may be formed by using a forming mold that can be divided into two parts, the mold, having a spherical cavity therein, is formed with a large number of protrusions for forming dimples (dimple forming protrusions) on the wall surface of the cavity, and has a parting line substantially at the position of the equator of the cavity.

In the case in which the mold is of an injection molding type, on the parting line thereof, forming material injection gates for injecting a cover material (resin material) for a ball are provided at equal intervals on the circumference. On a ball formed by cover material injection, the cover material having hardened within the gate remains in a projecting state, forming protrusions, and in addition, fine burrs are also produced at the parting line position of mold. The protrusions and burrs on the parting line are removed by grinding after formation.

In recent years, there have been proposed various kinds of seamless golf balls in which dimples are arranged even on the parting line (usually, coinciding with the equator line of the ball). These seamless golf balls have excellent flying performance because the degree of freedom of dimple arrangement is high so that dimples can be arranged evenly with high density on the surface of the ball.

For the above-described seamless golf ball, unfortunately, when the protrusions and burrs on the parting line are removed by grinding, the dimple portions (especially, dimple edge portions) are ground at the same time. As a result, the dimples are made shallow, which is undesirable. Therefore, there arises a problem in that the inherent ball performance is deteriorated and the appearance is also marred.

Also, the deformation of dimples due to grinding is sensitive to the degree of grinding, so that variations between golf balls have occurred.

The specification of Japanese Unexamined Patent Application Publication No. 11-114092 describes a method of forming protrusions near the dimples on the equator to avoid abrasion of dimples due to grinding.

SUMMARY OF THE INVENTION

An object of the present invention is to provide a mold for forming a golf ball, which allows a dimple formed adjacent to the equator of golf ball corresponding to the partition surface of upper and lower molds to be formed so as to have the same shape as that of a dimple formed in other regions, and a golf ball formed using this mold.

To achieve the above object, a mold for forming a golf ball in accordance with the present invention comprises at least two body parts, a cavity being formed within the mold by the joining of the at least two body parts, in which at least one of the body parts comprise a groove for forming a projecting land part which is ground after the formation of the golf ball in a cavity wall surface adjacent to the entire circumference of a parting line formed by the joining.

In the mold for forming a golf ball in accordance with the present invention, the groove preferably has a depth of about 0.005 mm to about 1 mm from the imaginary spherical surface of the cavity.

Also, in the mold for forming a golf ball in accordance with the present invention, the bottom surface of the groove and the wall surface of the cavity are preferably connected to each other asymptotically.

Also, in the mold for forming a golf ball in accordance with the present invention, the width of the groove is preferably not more than about 10 mm.

Also, in the mold for forming a golf ball in accordance with the present invention, the bottom surface of the groove preferably includes a spherical surface part having the same center as the center of the spherical surface shape of the wall surface of the cavity.

According to another aspect of the present invention, a golf ball in accordance with the present invention is manufactured by being formed using the above-described mold for forming a golf ball and then by grinding the projected land part.

By making the land part on the parting line, which is removed at the time of grinding after formation, high, the dimple existing adjacent to the equator of the golf ball can be prevented from being scraped by grinding and being deformed.

Also, thereby, the adjustment width of symmetry of dimples arranged on the golf ball surface can be widened, and furthermore, the appearance of the golf ball can be improved.

BRIEF DESCRIPTION OF THE DRAWINGS

FIG. 2 is a perspective view showing dimple forming protrusions adjacent to the joint surface of a mold for forming a golf ball in accordance with the present invention and a cavity wall surface;

FIGS. 3A and 3B are side views of a golf ball manufactured using a mold for forming a golf ball in accordance with the present invention, FIG. 3A showing a state before grinding, and FIG. 3B showing a state after grinding;

FIG. 4 is a perspective view showing the vicinity of the equator of a golf ball injection molded using a mold for forming a golf ball in accordance with the present invention;

DETAILED DESCRIPTION OF THE INVENTION

One embodiment of the present invention is described below in detail with reference to the accompanying drawings.

Figure 1:
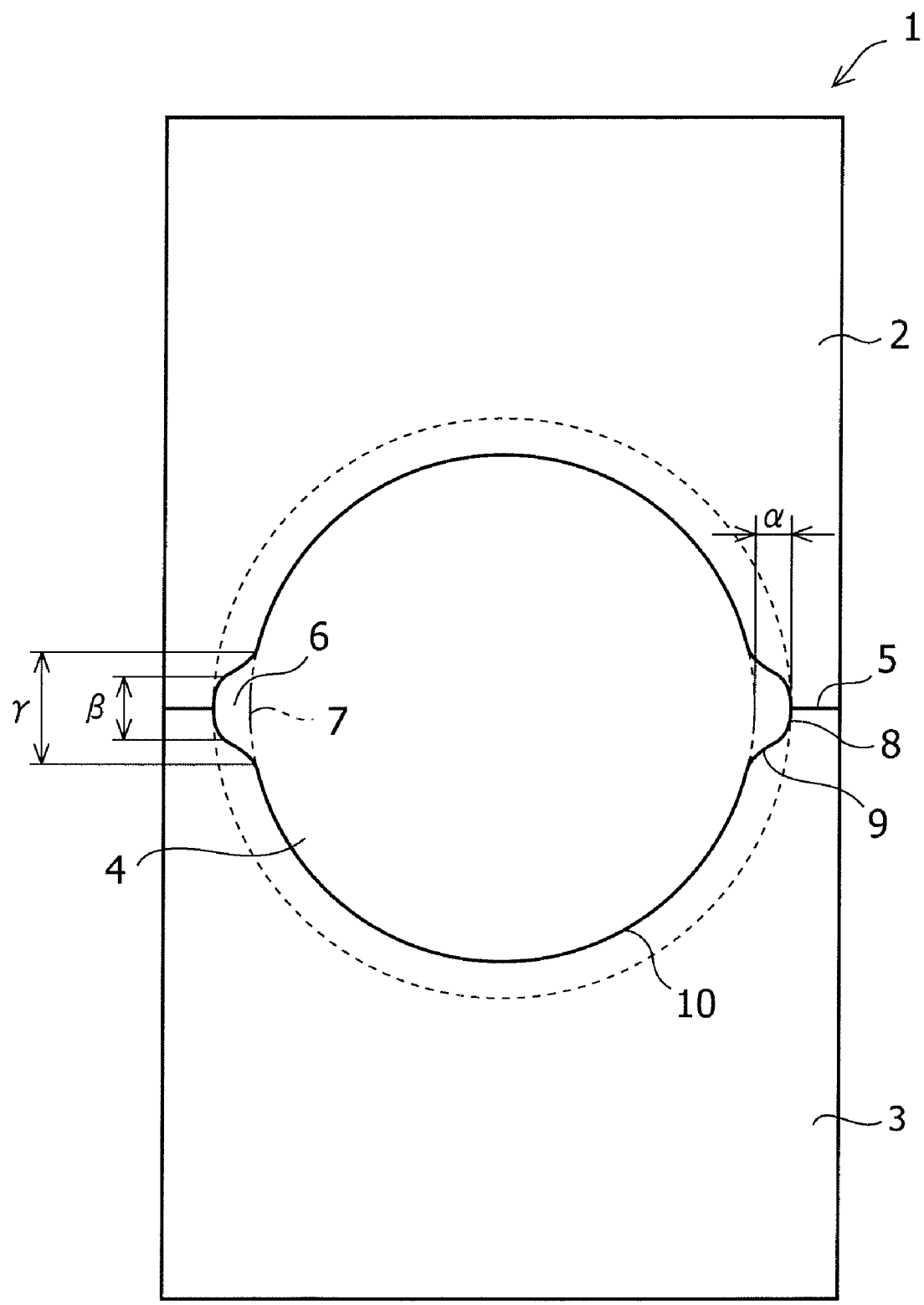
FIG. 1 is a side sectional view showing one embodiment of a mold for forming a golf ball in accordance with the present invention.

In the case in which a golf ball is manufactured by an injection molding process, an injection molding mold 1, for example, shown in FIG. 1 is used. This injection molding mold 1 includes a body part 2 of a metallic upper mold and a body part 3 of a metallic lower mold. By separatably joining the body parts 2 and 3 of the upper and lower molds together, an internal cavity 4 is formed.

As shown in FIG. 1, the body parts 2 and 3 of the mold 1 in accordance with the present invention each have a groove 6 in a cavity wall surface 10 adjacently to a parting line 5 between the body parts. This groove 6 is a groove for forming a projecting land part for grinding that further projects from the land part of a golf ball on the equator surface of a formed golf ball. The groove 6 is formed in both of the body parts 2 and 3 of the upper and lower molds. In FIG. 1, protrusions for forming dimples are omitted for ease of understanding. Also, a runner, gate, support pin, vent pin, and the like arranged around the cavity are omitted. The kind, number, and arrangement of these elements can be chosen in the same way as the conventional mold.

The projecting land part for grinding formed on the equator of an injection molded golf ball is designed so as to be higher than the land part of the golf ball in regions other than the region near the equator. Therefore, the groove 6 provided in the body parts 2 and 3 of the mold 1 preferably has a depth α from an imaginary spherical surface 7 of the internal cavity 4. The depth α is preferably changed appropriately depending on the grinding conditions. The upper limit of the depth α is preferably about 100 μm, further preferably about 80 μm, and still further preferably about 60 μm. Also, the lower limit of the depth α is preferably about 5 μm, and is more preferably about 10 μm. If the depth α is greater than the upper limit, grinding work takes much time, and also a golf ball having a low degree of sphericity may be formed. If the depth α is less than the lower limit, the dimple shape may be deteriorated.

Also, a connecting surface 9 between a groove bottom surface 8 and the cavity wall surface 10 of the body parts 2 and 3 preferably connects these two surfaces to each other asymptotically. The phrase "connect asymptotically" means that curves are connected smoothly to each other so as to approach the asymptotic line gradually. That is to say, the groove bottom surface 8 and the cavity wall surface 10 of the body parts 2 and 3 are connected to each other by the connecting surface 9 having a smooth curve shape. As a result, the projecting land part for grinding of an injection molded golf ball is connected smoothly to the land part of the golf ball. Therefore, when grinding is performed after injection molding, a change in grinding force can be accommodated properly.

The groove bottom surface 8 preferably has a width β such that a preferred projecting land part for grinding is formed. The width β of the groove bottom surface 8 is preferably changed appropriately depending on the grinding conditions. The upper limit of the width β is preferably about 10 mm, is more preferably about 8 mm, and is still more preferably about 7 mm. Also, the lower limit of the width β is preferably about 0.2 mm, and is more preferably about 0.4 mm.

Also, the groove 6 preferably has a width γ such that a preferred projecting land part for grinding is formed. The width γ of the groove 6 is preferably changed appropriately depending on the grinding conditions. The upper limit of the width γ is preferably about 10 mm, is more preferably about 8 mm, and is still more preferably about 7 mm. Also, the lower limit of the width γ is preferably about 0.2 mm, and is more preferably about 0.4 mm, and is still more preferably about 1 mm.

If the width γ of the groove 6 exceeds 5 mm, the grinding area becomes too large, so that the grinding process takes much time, and also the symmetry of a golf ball may be marred. On the other hand, if the width γ of the groove 6 is narrower than 0.1 mm, deformation of dimple shape due to grinding cannot be prevented.

The groove bottom surface 8 of the body parts 2 and 3 is preferably of a shape having a spherical surface portion having the same center as the center of the imaginary spherical surface 7. Thereby, the projecting land part for grinding of an injection molded golf ball is shaped so as to have a spherical surface portion having the same center as the center of a spherical surface consisting of the land part of golf ball, so that uniform grinding can be performed.

FIG. 2 shows the parting line 5 and the cavity wall surface 10 in the body part 3 of the lower mold of the mold 1. FIG. 2 shows protrusions 12 for forming noncircular dimples. However, needless to say, the present invention can be applied to circular dimples. Also, FIG. 2 shows a case in which the parting line is a zigzag line. However, needless to say, the parting line can be made linear or wavy. As shown in FIG. 2, a joint surface 11 and the groove bottom surface 8 for forming the projecting land part for grinding are continuous with each other. The groove bottom surface 8 continues to the projection 12 for forming the dimple or the connecting surface 9.

In the case in which the dimples are arranged so as to straddle the equator surface of golf ball, the protrusion 12 for forming the dimple is continuous with the joint surface 11 directly without the groove bottom surface 6 being interposed.

FIG. 3 shows a golf ball manufactured using a mold 1 for forming a golf ball in accordance with the present invention. FIG. 3A is a side view of the golf ball before grinding which is formed using a mold 1 for forming a golf ball in accordance with the present invention. As shown in FIG. 3A, a golf ball 30A injection molded using the mold 1 for forming a golf ball in accordance with the present invention has a projecting land part 32 for grinding around an equator 31 thereof. For ease of understanding, the illustration of dimples is omitted. The projecting land part 32 for grinding and a land part 34 of the golf ball are connected to each other by a connecting land part 33. The connecting land part 33 preferably has a shape so as to be smoothly continuous with the land part 34. The projecting land part 32 has a spherical surface having the same center as the center of the spherical surface of the golf ball land part 34. FIG. 3B is a side view showing the state after grinding of the injection molded golf ball shown in FIG. 3A. For the golf ball injection molded using the mold 1 for forming a golf ball in accordance with the present invention, the projecting land part 32 for grinding on the equator 31 is removed by grinding work for removing burrs and the like. Thus, a spherical golf ball 30B is manufactured.

FIG. 4 shows the relationship between the projecting land part 32 for grinding and dimples 35. Many dimples 35 are formed in the surface of golf ball. Around the equator 31 of the golf ball, the projecting land part 32 for grinding is formed. Dimples 35a adjacent to the equator 31 each have a predetermined depth from the imaginary land part like other dimples 35. Therefore, at the edge adjoining the projecting land part 32 for grinding of the dimple 35a, a cliff 36 corresponding to the height α of the projecting land part 32 for grinding is formed. The projecting land part 32 for grinding is continuous with the land part 34 via the connecting land part 33.

Figure 5A:
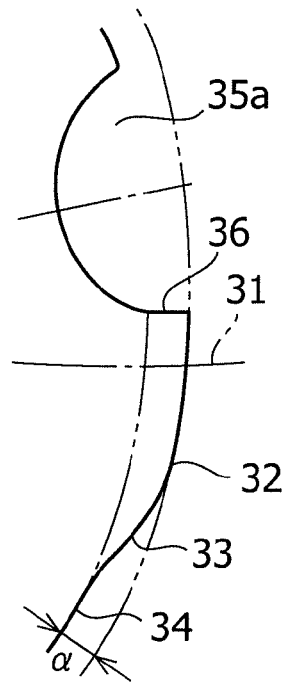
FIGS. 5A and 5B are side views showing a part of the equator surface of a golf ball manufactured using a mold for forming a golf ball in accordance with the present invention, FIG. 5A showing a state before grinding, and FIG. 5B showing a state after grinding.
Figure 5B:
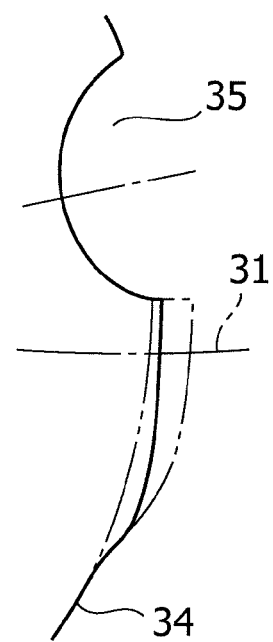

FIG. 5A is sectional views taken along the line A-A of FIG. 4. FIG. 5A is an equator surface side sectional view of the golf ball before grinding, which is formed using the mold 1. As shown in FIG. 5A, adjacent to the equator 31 of the formed golf ball, the projecting land part 32 for grinding having a width in the direction of upper and lower poles excluding the region of the dimple 35a is formed. The projecting land part 32 for grinding is continuous with the land part 34 via the connecting land part 33. Also, the projecting land part 32 for grinding has the height of α with respect to the land part 34. FIG. 5B shows a state after grinding of the formed golf ball shown in FIG. 5A. As shown in FIG. 5B, the projecting land part 32 for grinding having been formed adjacent to the equator 31 of golf ball is scraped by grinding. However, grinding is not performed exceeding the height α of the projecting land part 32 for grinding, so that the dimple 35a existing adjacent to the equator 31 does not lose its shape.

Also, even if the scraped height somewhat varies depending on the grinding force, the ball surface after grinding can maintain the spherical shape because the connecting land part 33 connects smoothly with the land part 34.

Figure 6A:
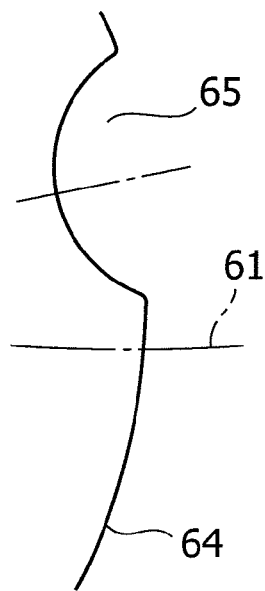
FIGS. 6A and 6B are side views showing a part of the equator surface of a golf ball manufactured using a conventional mold for forming a golf ball, FIG. 6A showing a state before grinding, and FIG. 6B showing a state after grinding.
Figure 6B:
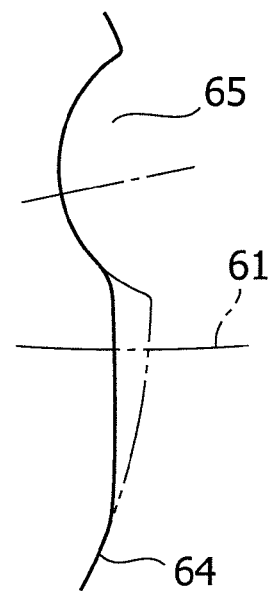

FIG. 6 is side sectional views of the equator surface of a golf ball formed using a conventional mold for forming a golf ball. FIG. 6A shows a golf ball after injection molding and before grinding. As shown in FIG. 6A, near an equator 61 of a golf ball having been injection molded using the conventional mold, a golf ball land part 64 having a height almost the same as that of other regions is formed. FIG. 6B shows a golf ball after grinding. As shown in FIG. 6B, when the golf ball injection molded using the conventional mold is ground, a portion near the equator 61 is ground excessively as compared with other regions. Therefore, the shape of the dimple existing adjacent to the equator 61 of golf ball is changed from the desired shape.

Also, a golf ball can be formed using the mold 1 for forming a golf ball in accordance with the present invention. In the present invention, the core constituting the golf ball is not subject to any special restriction, and various cores such as a single-layer solid core, a solid core having a plurality of vulcanized rubber layers, a solid core having a plurality of resin layers, and a thread-wound core having a thread rubber layer can be used. Also, a cover layer can be formed around the core by using the mold in accordance with the present invention. As the material of the cover layer, a publicly known thermoplastic resin or thermoplastic elastomer, which uses ionomer resin or urethane resin as a main ingredient, can be used suitably. The number of cover layers is not limited to one, and the cover can be formed into a multilayer structure having two or more layers. The thickness (per one layer) of the cover layer can be chosen appropriately depending on the core diameter and the number of cover layers, and is preferably in the range of about 0.5 mm to about 3.0 mm.

The kinds and shapes of dimples formed in large numbers in the surface of golf ball are not subject to any special restriction. However, the dimples may be of a circular shape or noncircular shape of the same kind or a different kind. Dimples having a diameter of about 0.5 mm to about 6 mm and a depth of about 0.05 mm to about 0.4 mm can be adopted appropriately. As the arrangement mode of these dimples, various arrangement patterns such as a regular dodecahedron, regular icosahedron, and regular octahedron can be used.

In the above description, a specific embodiment of the mold for forming a golf ball in accordance with the present invention has been explained. However, the present invention is not limited to this embodiment, and all changes and modifications that are apparent to those skilled in the art are embraced in the technical scope of the present invention.

DESCRIPTION OF SYMBOLS

1 . . . mold for forming a golf ball
2 . . . upper body part
3 . . . lower body part
4 . . . internal cavity
5 . . . parting line
6 . . . groove
7 . . . imaginary spherical surface
8 . . . groove bottom surface
9 . . . connecting surface
10 . . . cavity wall surface
11 . . . joint surface
12 . . . protrusion for forming a dimple
30A . . . injection molded golf ball
30B . . . ground golf ball
31, 61 . . . equator
32 . . . projecting land part for grinding
33 . . . connecting land part
34, 64 . . . land part
35, 65 . . . dimple
36 . . . cliff

What is claimed is:

1. A mold for forming a golf ball, comprising at least two body parts, a cavity being formed within the mold by the joining of the at least two body parts,
   wherein at least one of the body parts comprise:
   a plurality of protrusions for forming a plurality of dimples;
   a cavity wall surface for forming a land part of the golf ball; and
   a groove for forming a projecting land part which is ground after the formation of the golf ball,
   wherein the groove extends along the whole circumference of a parting line formed by the joining, except where the protrusion is arranged on the parting line, and
   wherein the groove has a cliff portion projected from an edge of the groove, the groove being adjacent to the dimple-forming protrusion through the cliff portion which has a height to be ground.

2. The mold for forming a golf ball according to claim 1, wherein the groove has a depth of about 5 μm to about 100 μm from the imaginary spherical surface of the cavity.

3. The mold for forming a golf ball according to claim 1, wherein the bottom surface of the groove and the wall surface of the cavity are connected to each other asymptotically.

4. The mold for forming a golf ball according to claim 1, wherein the width of the groove is not more than about 10 mm.

5. The mold for forming a golf ball according to claim 1, wherein the bottom surface of the groove includes a spherical surface part having the same center as the center of the spherical surface shape of the wall surface of the cavity.

6. The mold for forming a golf ball according to claim 1, wherein the groove extends along continuously along both sides of the parting line.

7. The mold for forming a golf ball according to claim 1, wherein the groove is adjacent to the protrusion that is arranged on the parting line.

* * * * *